(12) United States Patent
Piperni

(10) Patent No.: US 12,122,510 B2
(45) Date of Patent: Oct. 22, 2024

(54) VARIABLE WING LEADING EDGE CAMBER

(71) Applicant: Bombardier Inc., Dorval (CA)

(72) Inventor: Pasquale Piperni, Québec (CA)

(73) Assignee: Bombardier Inc., Dorval (CA)

( * ) Notice: Subject to any disclaimer, the term of this patent is extended or adjusted under 35 U.S.C. 154(b) by 160 days.

(21) Appl. No.: 17/133,033

(22) Filed: Dec. 23, 2020

(65) Prior Publication Data

US 2021/0197952 A1 Jul. 1, 2021

Related U.S. Application Data

(60) Provisional application No. 62/954,213, filed on Dec. 27, 2019.

(51) Int. Cl.
*B64C 3/48* (2006.01)
*B64C 3/44* (2006.01)

(52) U.S. Cl.
CPC .......... *B64C 3/48* (2013.01); *B64C 2003/445* (2013.01)

(58) Field of Classification Search
CPC ....... B64C 3/48; B64C 2003/445; B64C 3/14; B64C 3/50; B64C 2003/142; B64C 2003/149; B64C 3/44; B64C 3/36; Y02T 50/10
See application file for complete search history.

(56) References Cited

U.S. PATENT DOCUMENTS

| | | | |
|---|---|---|---|
| 1,095,952 A | 5/1914 | Arnoux | |
| 1,791,146 A | 2/1931 | Rocheville | |
| 2,349,858 A | 5/1944 | Gillmor | |
| 2,511,504 A | 6/1950 | Hawkins | |
| 3,179,357 A | 4/1965 | Lyor | |
| 3,831,886 A | 8/1974 | Burdges et al. | |
| 4,053,124 A | 10/1977 | Cole | |
| 4,351,502 A * | 9/1982 | Statkus | B64C 3/48 244/214 |
| 7,048,234 B2 | 5/2006 | Recksiek et al. | |
| 9,180,962 B2 | 11/2015 | Moser et al. | |

(Continued)

FOREIGN PATENT DOCUMENTS

| CA | 2713359 A1 * | 9/2009 | ............. B64C 23/00 |
|---|---|---|---|
| CA | 2713363 A1 * | 9/2009 | ............. B64C 23/04 |

(Continued)

OTHER PUBLICATIONS

Bolonkin et al. "Estimated Benefits of Variable-Geometry Wing Camber Control for Transport Aircraft", NASA (Year: 1999).*

(Continued)

*Primary Examiner* — Assres H Woldemaryam
(74) *Attorney, Agent, or Firm* — CHRISTENSEN O'CONNOR JOHNSON KINDNESS PLLC

(57) ABSTRACT

A disclosed method reduces a wave drag on an airfoil traveling at a speed. At least a portion of the airfoil is configured to be selectively moveable between a first position and a second position. The first position is a neutral position, and the second position generates a shock wave near to the leading edge of the airfoil. The method includes the steps of maintaining the airfoil in the first position when the speed is less than a first limit and moving the airfoil to the second position when the speed is greater than a first limit.

5 Claims, 7 Drawing Sheets

(56) References Cited

U.S. PATENT DOCUMENTS

| | | | |
|---|---|---|---|
| 9,233,755 B1* | 1/2016 | Chase | B64C 7/00 |
| 9,598,167 B2 | 3/2017 | Grip et al. | |
| 9,656,741 B2 | 5/2017 | Moser et al. | |
| 10,718,221 B2* | 7/2020 | Rice | F01D 17/148 |
| 2006/0060720 A1* | 3/2006 | Bogue | B64C 39/12 |
| | | | 244/200 |
| 2008/0149779 A1* | 6/2008 | Phillips | B64C 3/52 |
| | | | 244/201 |
| 2009/0294596 A1* | 12/2009 | Sinha | B64C 21/08 |
| | | | 244/200 |

FOREIGN PATENT DOCUMENTS

| | | | | |
|---|---|---|---|---|
| CA | 2518080 C * | 2/2014 | | B63B 1/285 |
| CA | 2899238 A1 * | 7/2014 | | B64C 21/04 |
| EP | 1 338 506 A1 | 8/2003 | | |
| KR | 20180044170 A * | 5/2018 | | B64C 3/48 |
| RU | 2498929 C2 * | 11/2013 | | B64C 23/04 |
| WO | WO-2009106870 A2 * | 9/2009 | | B64C 23/04 |

OTHER PUBLICATIONS

Entsminger et al. (doc. "General Dynamics F-16 Fighting Falcon" (Year: 2004).*

"Flaps and Slats," National Aeronautics and Space Administration (NASA), Glenn Research Center, updated Nov. 2018, 2 pages <https://www.grc.nasa.gov/www/k-12/airplane/flap.html>.

Takahashi, H., et al., "Development of Variable Camber Wing With Morphing Leading and Trailing Sections Using Corrugated Structures," Journal of Intelligent Material Systems and Structures, vol. 27, Issue 20, 2016; 1-page abstract only.

* cited by examiner

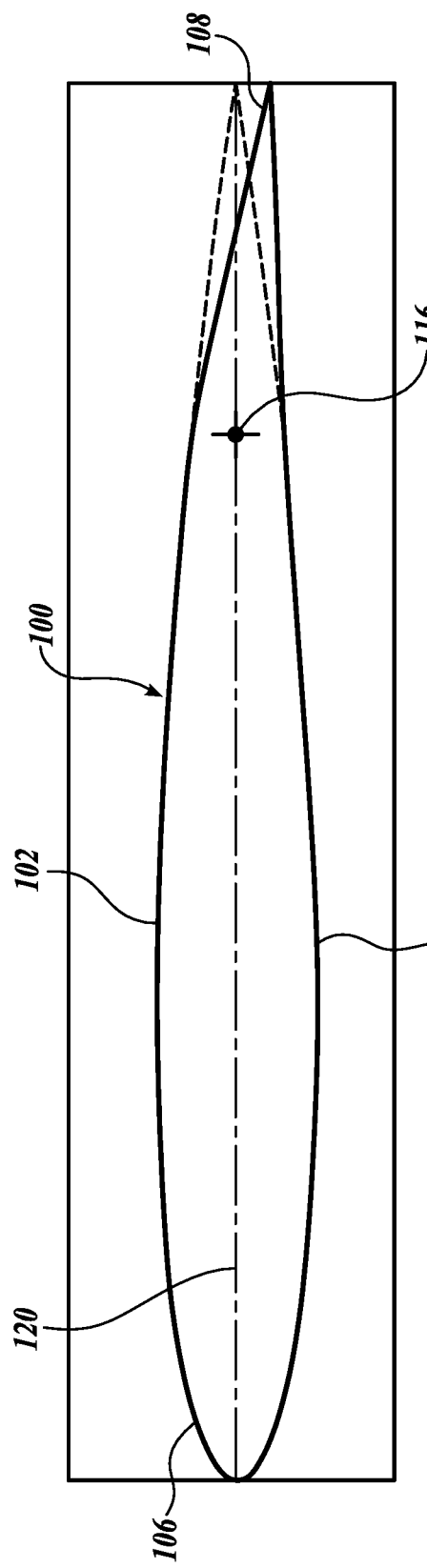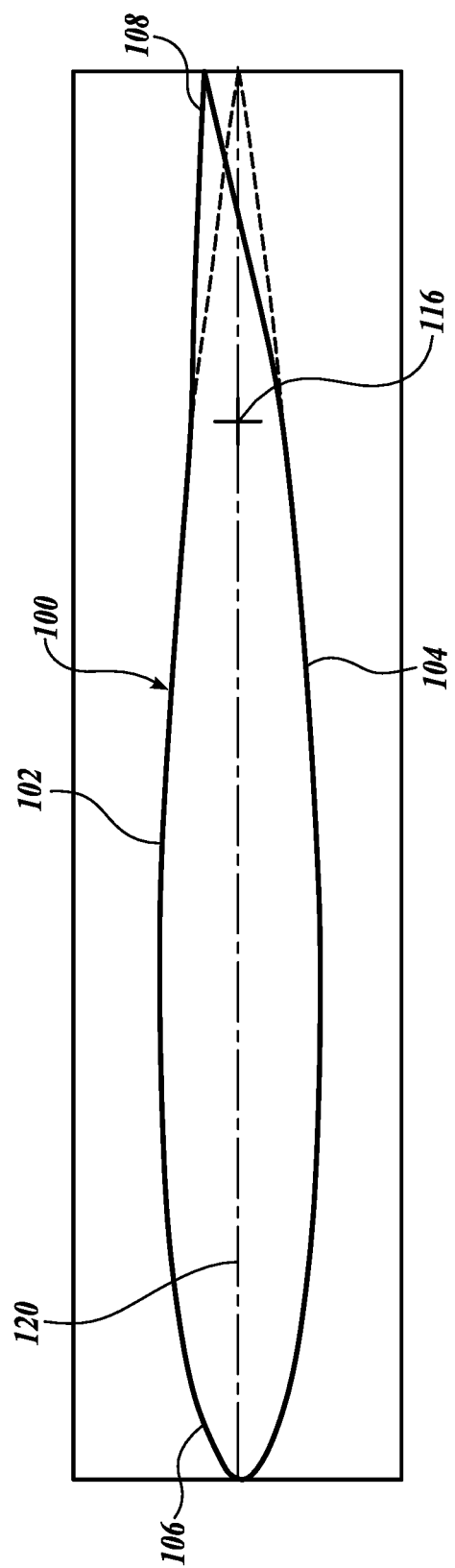

VARIABLE WING LEADING EDGE CAMBER

CROSS-REFERENCE TO RELATED APPLICATION

This application claims the benefit of U.S. Provisional Patent Application No. 62/954,213, filed Dec. 27, 2019, which is incorporated herein by reference in its entirety.

FIELD

The present disclosure generally relates to airfoils. More particularly, the present disclosure relates to a method of reducing wave drag on an airfoil.

BACKGROUND

In aeronautics, aircraft are considered to be traveling at subsonic speeds when all of the airflow around the aircraft is slower than the speed of sound, i.e., a speed less than Mach 1.0. Typically, subsonic aircraft speeds are considered to be speeds less than Mach 0.8. For transonic aircraft speeds, generally considered to be in the range of Mach 0.8 to 1.2, a portion of the airflow around the aircraft is slower than Mach 1.0, and a portion of the airflow around the aircraft is faster than Mach 1.0. Above a speed of Mach 1.2 (and less than Mach 1.5), the aircraft is considered to be traveling at supersonic speeds because all of the airflow around the aircraft is faster than Mach 1.0

Most modern jet aircraft are designed to operate with a High-Speed Cruise (HSC) speed in the transonic regime, with civil jet aircraft typically having an HSC speed in the range of Mach 0.75 to 0.85. While higher HSC speeds are possible, the sharp increase in drag that accompanies these higher speeds results in higher fuel costs. As a result, HSC speeds are largely driven by economics.

In order to increase range and minimize fuel consumption, aircraft wings are generally designed to maximize the lift-to-drag ratio. For aircraft flying at high subsonic or transonic Mach numbers, shock waves are generated on the wing surface. These shock waves create wave drag, which is a significant portion of the total aircraft drag and can severely limit the HSC speed of the aircraft. Wave drag can also cause stability and control issues, such as early buffet onset, lateral stability problems, control-surface ineffectiveness, aileron reversal, etc.

FIG. 1 shows a conventional airfoil 50 traveling at a transonic speed. The shape of the airfoil causes supersonic flow on the forward portion of the upper surface of the airfoil and generates a strong shock wave on the upper surface of the airfoil. The strong shock wave creates undesirable wave drag that decreases the efficiency of the aircraft and increases operating costs.

Some existing solutions for reducing wave drag incorporate wing airfoils shaped specifically to minimize the strength of shock waves that form on the wings in transonic flight. One such solution is a known supercritical airfoil 60, which is shown traveling at a transonic speed in FIG. 2. As compared to the conventional airfoil shown in FIG. 1, the supercritical airfoil has a larger nose radius 62, a flatter upper surface 64 and a cambered trailing edge 66. These features move the boundary layer separation further back on the airfoil 60, resulting in a weaker shock wave and less wave drag.

Other solutions have included the use of variable camber trailing edge devices to reduce overall wing drag, which includes wave drag. The effectiveness of these and other approaches is limited by the wing geometry, including wing sweep and thickness characteristics.

SUMMARY

An embodiment of a disclosed method reduces wave drag on an airfoil traveling at a speed. At least a portion of the airfoil is configured to be selectively moveable between a first position and a second position. The first position is a neutral position, and the second position generates a shock wave near to the leading edge of the airfoil. The method includes the steps of maintaining the airfoil in the first position when the speed is less than a first limit and moving the airfoil to the second position when the speed is greater than a first limit.

In an embodiment, the step of moving the airfoil to the second position comprises moving the leading edge to a raised position.

In an embodiment, the shock wave is generated on an upper surface of the airfoil.

In an embodiment, the airfoil is further configured to be selectively moveable to a third position, the third position generating a shock wave on a lower surface of the airfoil proximate to the leading edge.

In an embodiment, the method further comprising the step of moving the leading edge to the third position when the speed is less than a second limit.

In an embodiment, the airfoil further includes a variable camber trailing edge selectively moveable between a neutral position and a lowered position, and the method further includes the steps of maintaining the trailing edge in the neutral position when the speed is greater than a third limit and moving the trailing edge to the lowered position when the speed is less than the third limit.

In an embodiment, the airfoil is an aircraft wing.

A second representative embodiment of a method reduces a wave drag on a wing of an aircraft traveling at a speed. At least a portion of the wing is an airfoil with a variable camber leading edge selectively moveable between a neutral position, an up-droop position, and down-droop position. The method includes the step of moving the leading edge to the up-droop position when the speed is greater than a first limit, wherein moving the leading edge to the up-droop position generates a shock wave proximate to the leading edge to reduce the wave drag. The method further includes the step of maintaining the leading edge in a neutral position when the speed is less than the first limit and greater than a second limit.

In an embodiment, the method further comprising the step of moving the leading edge to the down-droop position when the speed is less than a second limit.

In an embodiment, the airfoil further includes a variable camber trailing edge selectively moveable between a neutral position and down-droop position. The method further includes the steps of moving the trailing edge to the down-droop position when the speed is less than a third limit and maintaining the trailing edge in a neutral position when the speed is greater than the third limit.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein:

FIG. 5 shows the airfoil of FIG. 3, wherein the leading edge is in a neutral position, and the trailing edge is in a down-droop position;

FIG. 6 shows the airfoil of FIG. 3, wherein the leading edge is in a neutral position, and the trailing edge is in an up-droop position;

DETAILED DESCRIPTION

Figure 1:
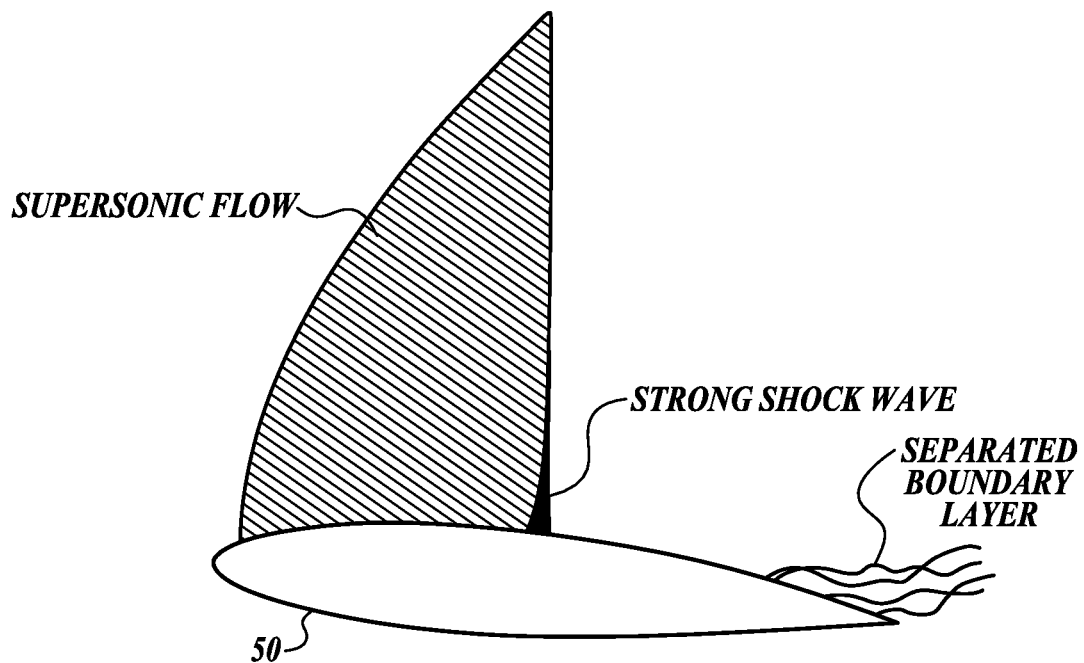
FIG. 1 shows airflow characteristics of a conventional airfoil traveling at high subsonic or transonic speeds.
Figure 2:
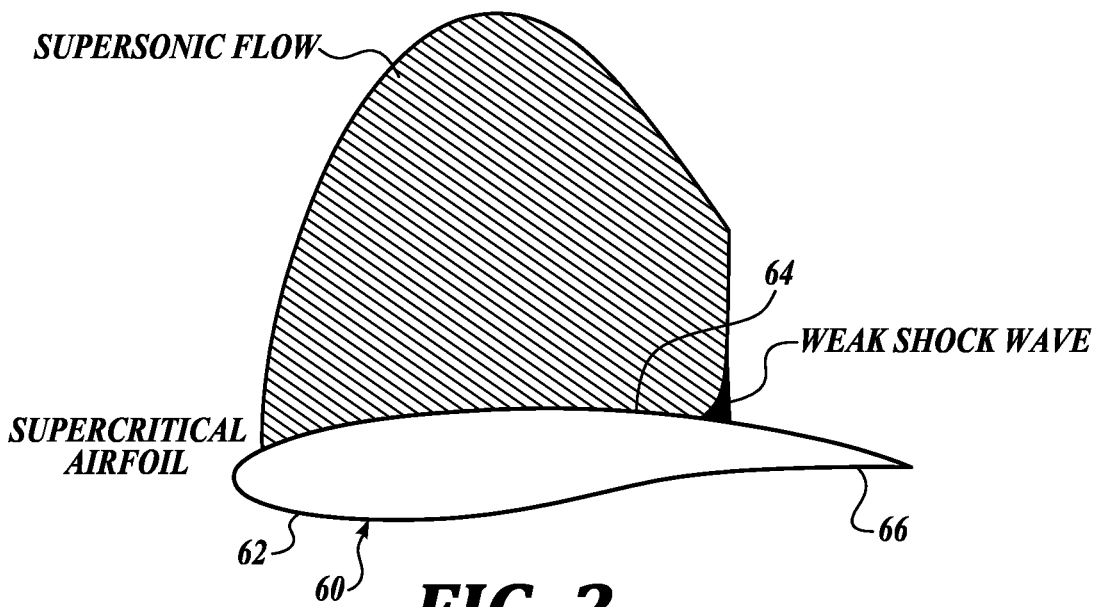
FIG. 2 shows airflow characteristics of a known supercritical airfoil traveling at high subsonic or transonic speeds.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Unless defined otherwise, all technical and scientific terms used herein have the same meaning as is commonly understood by one of skill in the art of the present disclosure. For the sake of clarity, the abbreviations for several terms used herein are set forth below, along with a brief description of the meaning of the term. The descriptions are not intended to be exhaustive and should not be considered limiting with respect the terms as they would be understood by one of ordinary skill in the art.

CL (lift coefficient): lift L divided by the quantity: density r times half the velocity V squared times the wing area A. The lift coefficient then expresses the ratio of the lift force to the force produced by the dynamic pressure times the area.

L/D (lift to drag ratio): the amount of lift generated by an airfoil compared to its drag. The lift/drag ratio is used to express the relation between lift and drag and is determined by dividing the lift coefficient by the drag coefficient, CL/CD. The lift to drag ratio indicates airfoil efficiency.

RE (Reynolds Number): a dimensionless number that indicates the ratio of inertial forces to viscous forces for given flow conditions.

$C_p$ (pressure coefficient): a dimensionless number that describes the relative pressures throughout a flow field in fluid dynamics. Every point in a fluid flow field has its own unique pressure coefficient.

Examples of a variable camber wing for an aircraft are set forth below according to technologies and methodologies of the present disclosure. The disclosed wings are also referred to herein by the more general term "airfoil" with the understanding that the disclosed subject matter is not limited to aircraft wings and can be implemented with other aerodynamic surfaces having the shape of an airfoil. In an embodiment, a portion of an aircraft wing is a variable camber airfoil that includes selectively adjustable leading edge. The leading edge can be raised from a neutral position to an "up-drooped" position when the aircraft is traveling at high subsonic or transonic speeds.

Referring now to FIGS. 3-6, a representative embodiment of a variable camber airfoil 100 according to the present disclosure is shown. The airfoil has the general shape of a conventional airfoil when in a neutral position, with an upper surface 102, a lower surface 104, a leading edge 106, a trailing edge 108, and a chord line 120 extending from the leading edge to the trailing edge.

Figure 3:
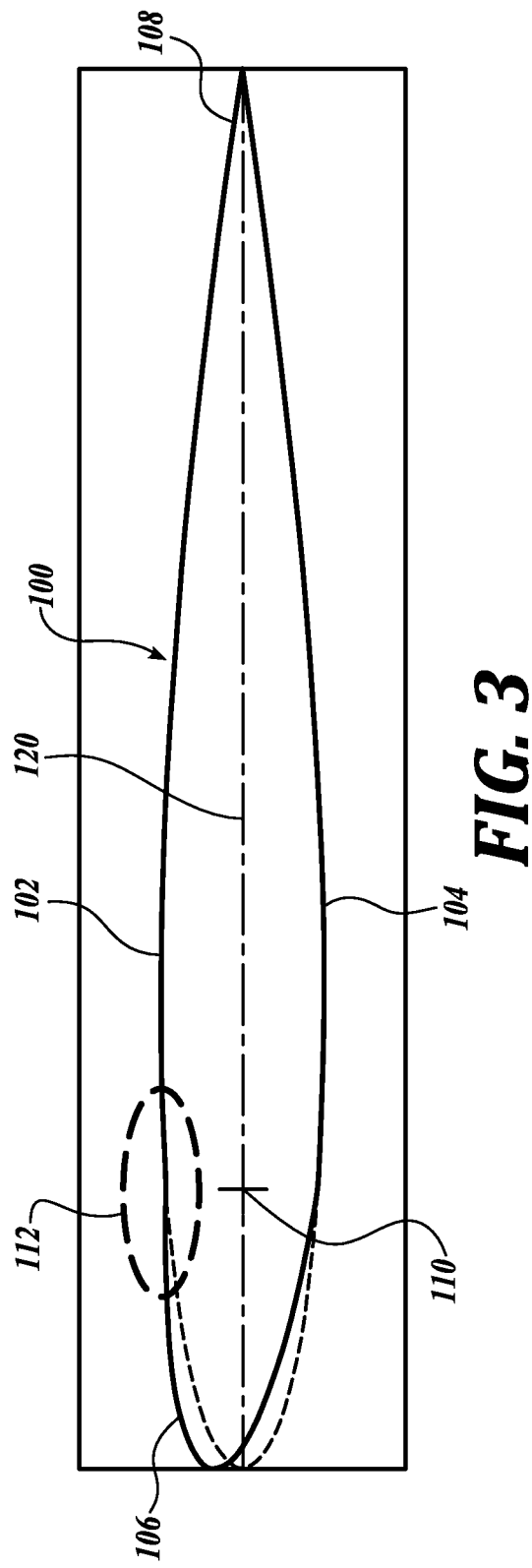
FIG. 3 shows a representative embodiment of a variable camber airfoil according to the present disclosure, wherein the leading edge is in an up-droop position, and the trailing edge is in a neutral position.
Figure 4:
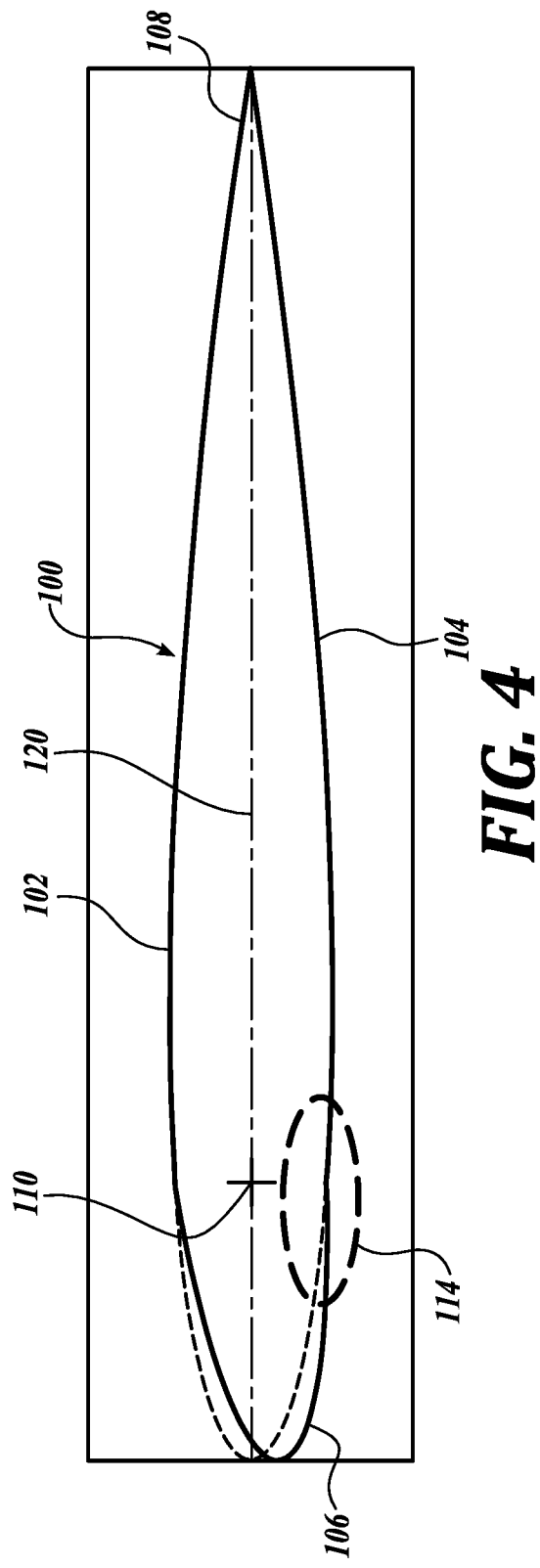
FIG. 4 shows the airfoil of FIG. 3, wherein the leading edge in a down-droop position, and the trailing edge is in a neutral position.

As shown in FIGS. 3 and 4, the leading edge 106 of the airfoil 100 is rotatable about a forward hinge point 110 to be selectively moveable from a neutral position, shown in dashed lines, to an up-droop position (FIG. 3) and a down-droop position (FIG. 4). When the airfoil 100 is in the up-droop position of FIG. 3, a localized concave discontinuity 112 is formed on a forward portion the upper surface 102 of the airfoil 100. Similarly, when the airfoil 100 is in the down-droop position of FIG. 4, a localized concave discontinuity 114 is formed on a forward portion the lower surface 104 of the airfoil 100. Referring to FIGS. 5 and 6, the trailing edge 108 of the airfoil 100 is rotatable about a hinge point 112 to be selectively moveable from a neutral position, shown in dashed lines, to an up-droop position (FIG. 5) and a down-droop position (FIG. 6).

Figure 7:
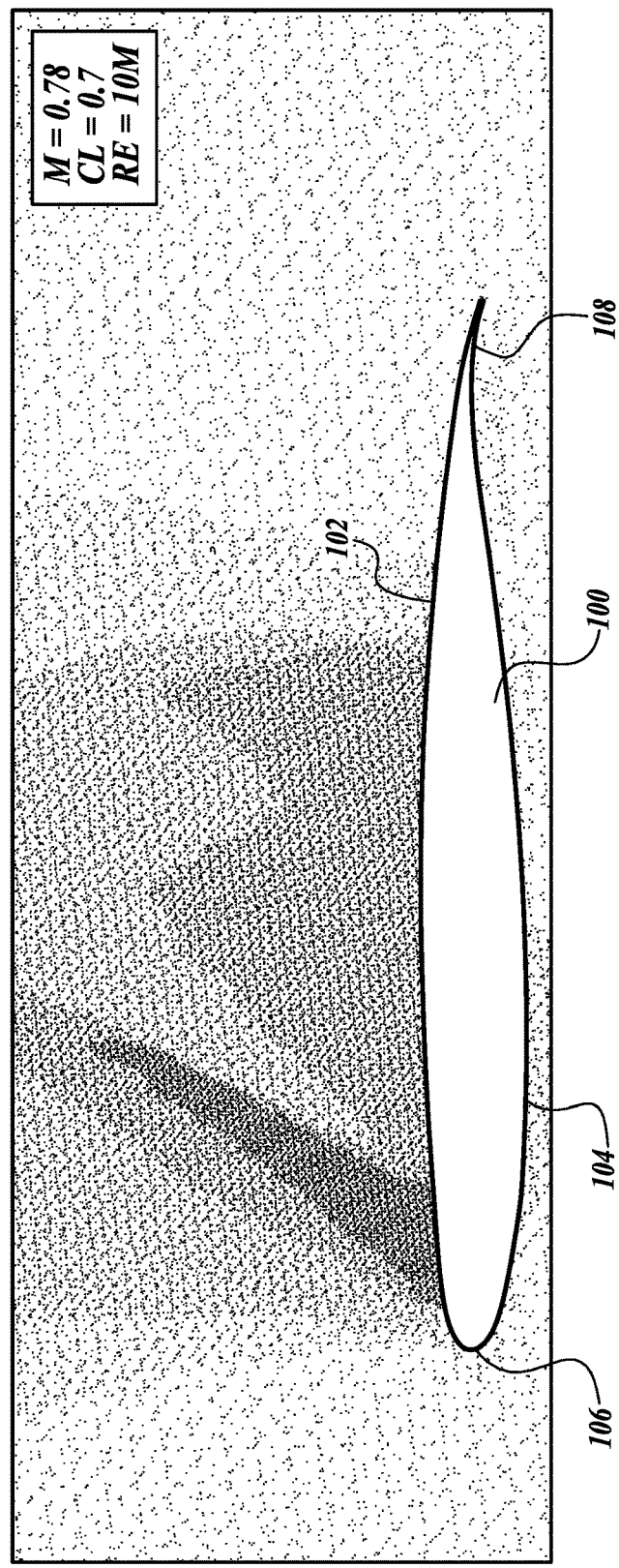
FIG. 7 shows airflow characteristics of the airfoil of FIG. 3 traveling at high subsonic or transonic speeds with the leading edge in an up-droop position and the trailing edge in a down-droop position.

FIG. 7 shows airflow around an embodiment of a disclosed airfoil with variable leading edge camber. As previously discussed, airfoils traveling at high subsonic or transonic speeds generate a shock wave on the upper surface of the airfoil, which in turn generates unwanted wave drag. The leading edge of the airfoil FIG. 7 is in an up-droop position, resulting in a localized concave discontinuity 112, as shown in FIG. 3. When the airflow along the upper surface of the airfoil is supersonic, the discontinuity 112 creates an oblique shock wave, which is indicated in FIG. 7 by the higher speed airflow at the forward end of the upper surface. The oblique shock wave shown in FIG. 7 reduces the flow velocities on the upper surface of the airfoil. Decelerating the flow velocities in this manner weakens the aft shock wave, thereby reducing wave drag induced by the aft shock wave. However, the induced forward oblique shock wave also imparts a drag penalty of its own, wherein the greater the strength of the forward oblique shock wave, the greater the drag penalty. Accordingly, the strength of the induced forward oblique shock wave should be strong enough to reduce the drag wave resulting the aft shock wave, but weak enough not to induce so much drag that the added drag negates the drag reduction, resulting in an overall increase in drag.

For a given Mach number, the greater the turning angle across the corner, the stronger the induced shockwave. Thus, the strength of the oblique shock wave can be controlled by varying the deflection angle of the leading edge, i.e., the amount of leading edge up-droop. In this manner, the airfoil can be optimized to minimize the wave drag for various flow conditions.

Shock waves induced by high subsonic and transonic flow are not limited to the upper surface of the airfoil. Under certain flight conditions, a strong shock wave forms on the lower surface of the airfoil, causing unwanted wave drag. Similar to moving the leading edge to the up-droop position, as previously described, moving the leading edge to a down-droop position, such as the position shown in FIG. 4, creates a concave corner 114 that induces an oblique shock wave on the forward portion of the lower surface. This oblique shock wave reduces the flow velocities on the lower surface of the airfoil, thereby weakening the aft shock wave and reducing wave drag induced by the aft shock wave. The leading-edge can also be deployed to a down-droop position at low speeds to enhance field performance by increasing the wing CLmax and improving stall characteristics.

The illustrated airfoil 100 utilizes a hinged leading edge to selectively provide a shock wave-inducing concave corner on the upper surface 102 or lower surface 104. It will be appreciated, however, that other configurations can be utilized to induce a shock wave on the forward end of the airfoil. In one embodiment, the airfoil includes a flexible, "morphing" leading edge. By deflecting the flexible leading edge upward or downward, a concave corner is approximated on the upper and lower airfoil surfaces, respectively.

In another embodiment, the leading edge of the airfoil has a flexible skin. Actuators positioned within the airfoil selectively deflect the skin to create localized bumps in the skin. Shockwaves form just forward of the bumps, so the airfoil selectively creates bumps just aft of where an oblique shock is desirable to weaken the aft shock wave and reduce wave drag.

The disclosed configurations for generating a forward oblique shockwave are exemplary only and should not be considered limiting. In this regard, any suitable configuration for selectively generating an oblique shock wave at a desired location may be implemented, and such configurations should be considered within the scope of the present disclosure.

In some embodiments, the forward variable camber is used without aft variable camber to achieve drag reduction by generating a forward oblique shockwave in the presence of a normal shockwave on the aft portion of the airfoil. In other embodiments, downward trailing edge camber (FIG. 5) or upward trailing edge camber (FIG. 6) is used in conjunction with forward variable camber to optimize the wing pressure distribution and to attenuate the normal shockwave on the aft portion of the airfoil.

FIGS. 8-12 show test data that illustrates the effectiveness of the described airfoil with a variable camber leading edge, with and without a variable camber trailing edge, as compared to a fixed airfoil.

Figure 8:
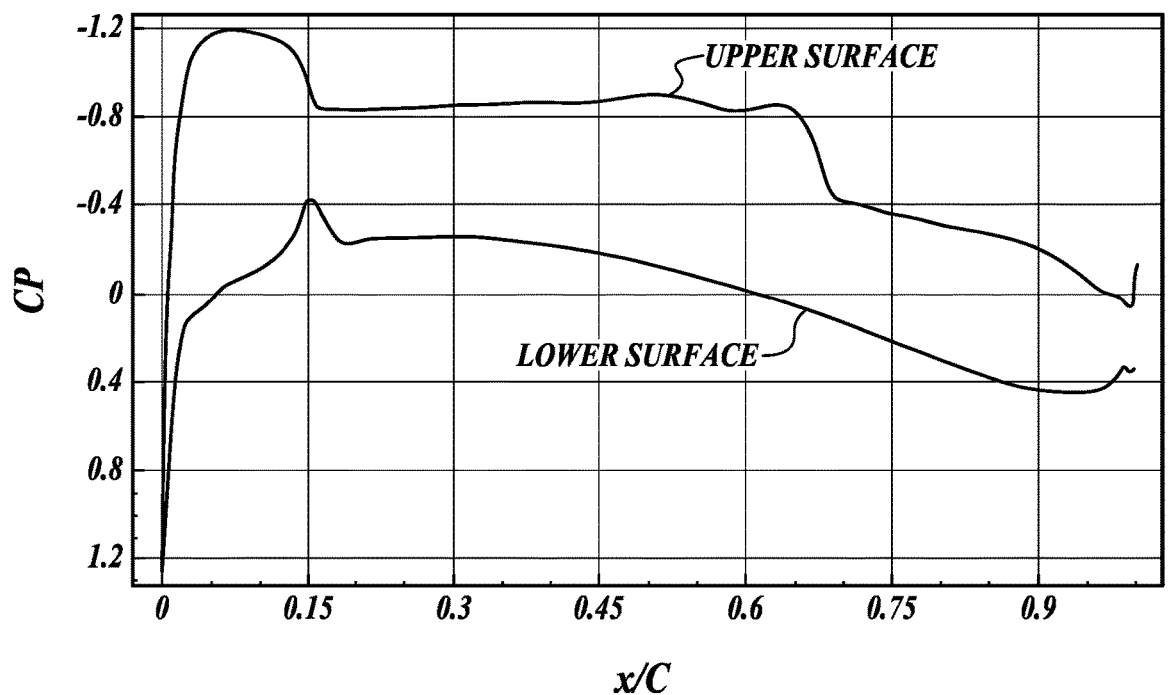
FIG. 8 shows a graph of the surface pressure coefficient along the upper and lower surfaces of the airfoil of FIG. 7.

FIG. 8 shows a graphical representation of the pressure distribution along the upper and lower surfaces of the airfoil in FIG. 7. Referring to the forward (left) portion of the upper surface curve, the oblique shock wave at leading edge, represented by the elevated pressure coefficient, results in a weaker aft shock wave, represented by the relatively flat pressure coefficient along the middle portion of the airfoil.

Figure 9:
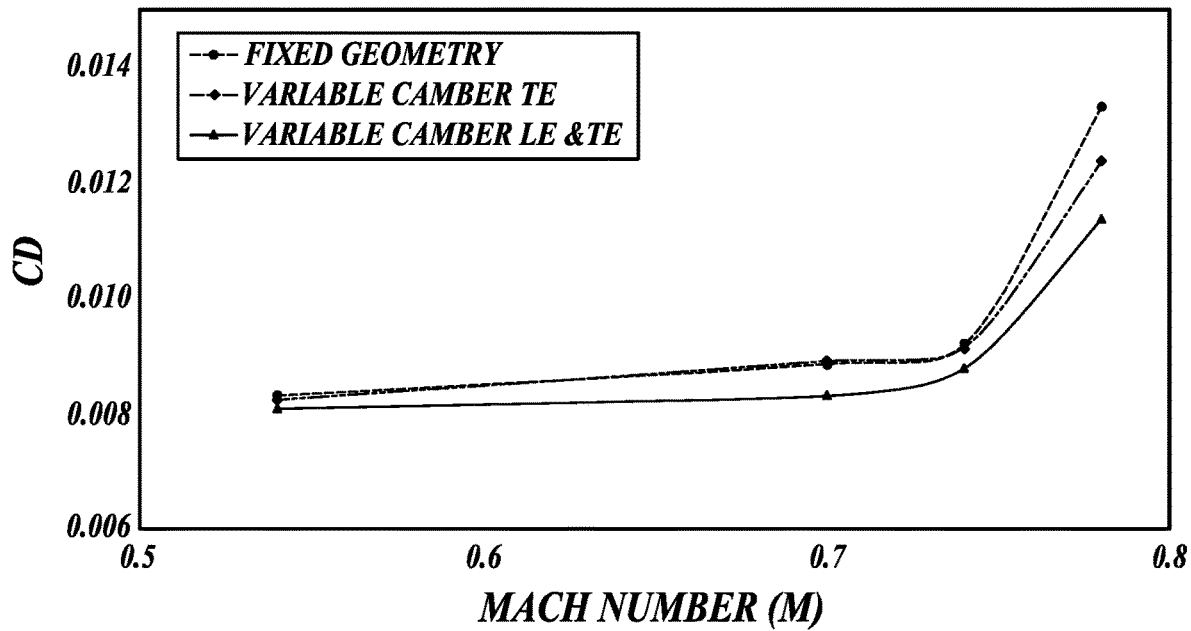
FIG. 9 shows a graph of drag rise of the airfoil of FIG. 7 compared to other airfoil configurations.

FIG. 9 compares the drag rise of (i) a fixed geometry airfoil, (ii) an airfoil with a variable camber trailing edge, and (iii) an airfoil with variable camber leading and trailing edges. For each airfoil, the drag coefficient relative to speed is represented. For the fixed geometry airfoil and the variable camber trailing edge airfoil, the drag coefficients are roughly equal in the subsonic regime, but diverge as the airfoils enter the transonic regime, in which drag coefficient increases more rapidly, with the drag coefficient of the fixed geometry airfoil increasing more rapidly. Over the same speeds, the airfoil with variable camber leading and trailing edges has a lower drag coefficient in the subsonic regime, and remains lower and increases at a lower rate in the transonic regime.

Figure 10:
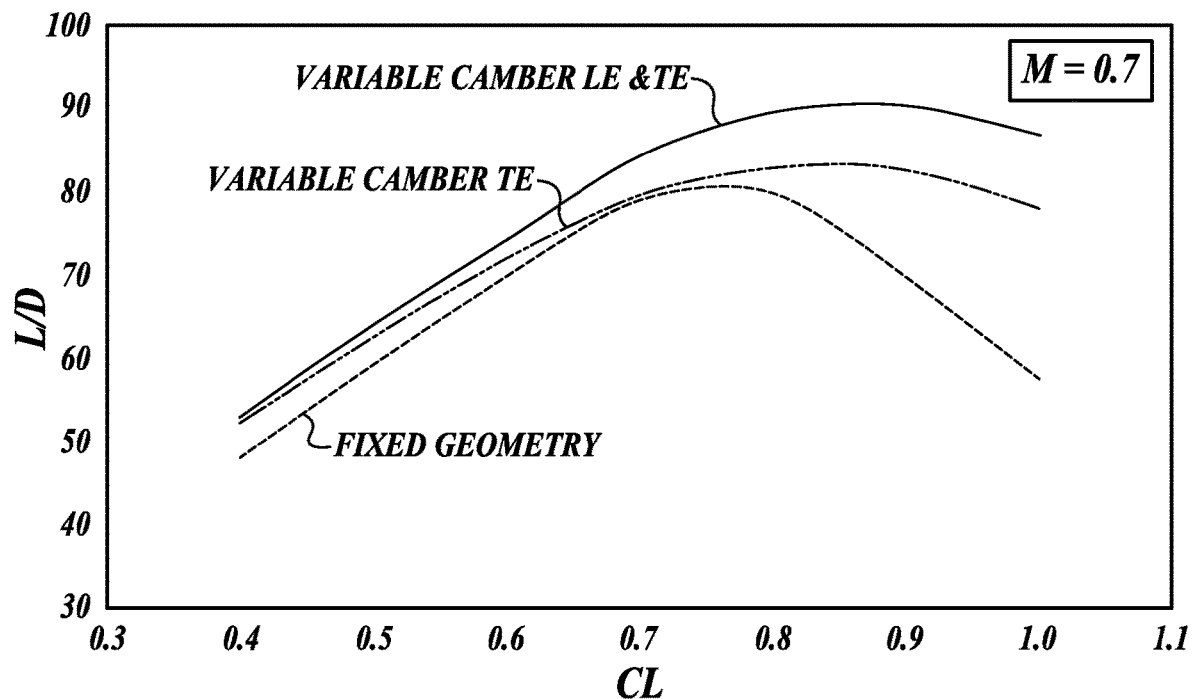
FIG. 10 shows a graph of lift to drag ratio (L/D) relative to the lift coefficient (CL) for the airfoil of FIG. 7 at Mach 0.7.
Figure 11:
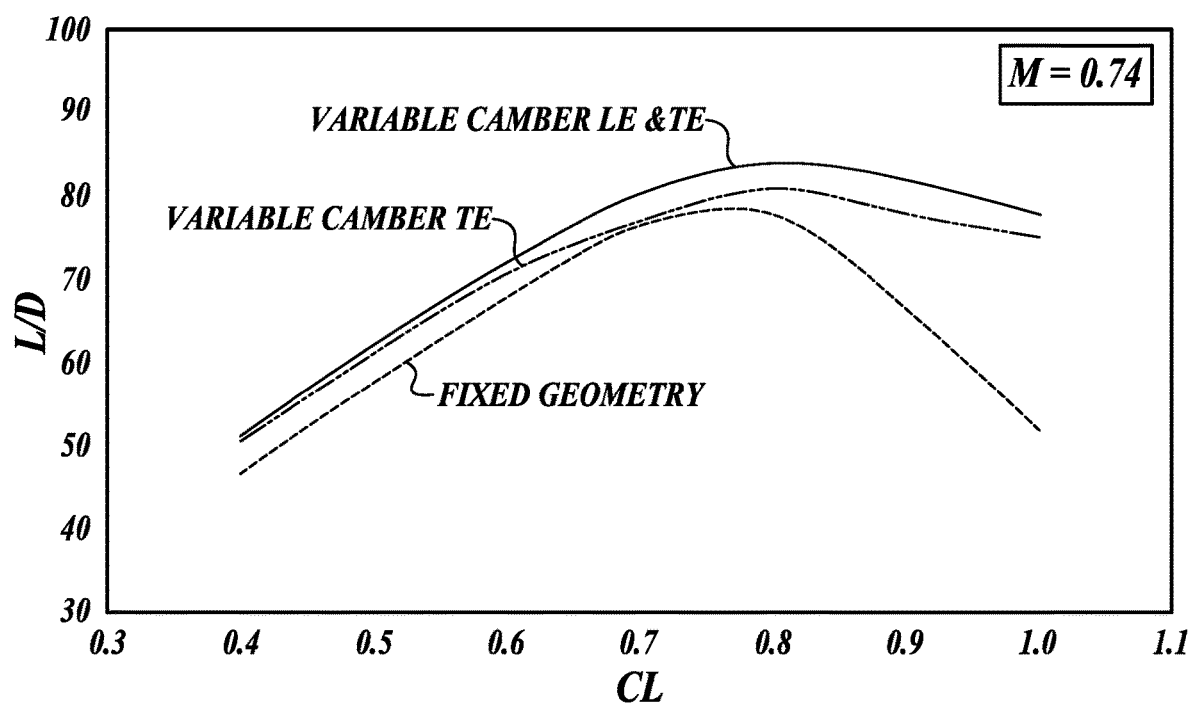
FIG. 11 shows a graph of lift to L/D relative to CL for the airfoil of FIG. 7 at Mach 0.74.
Figure 12:
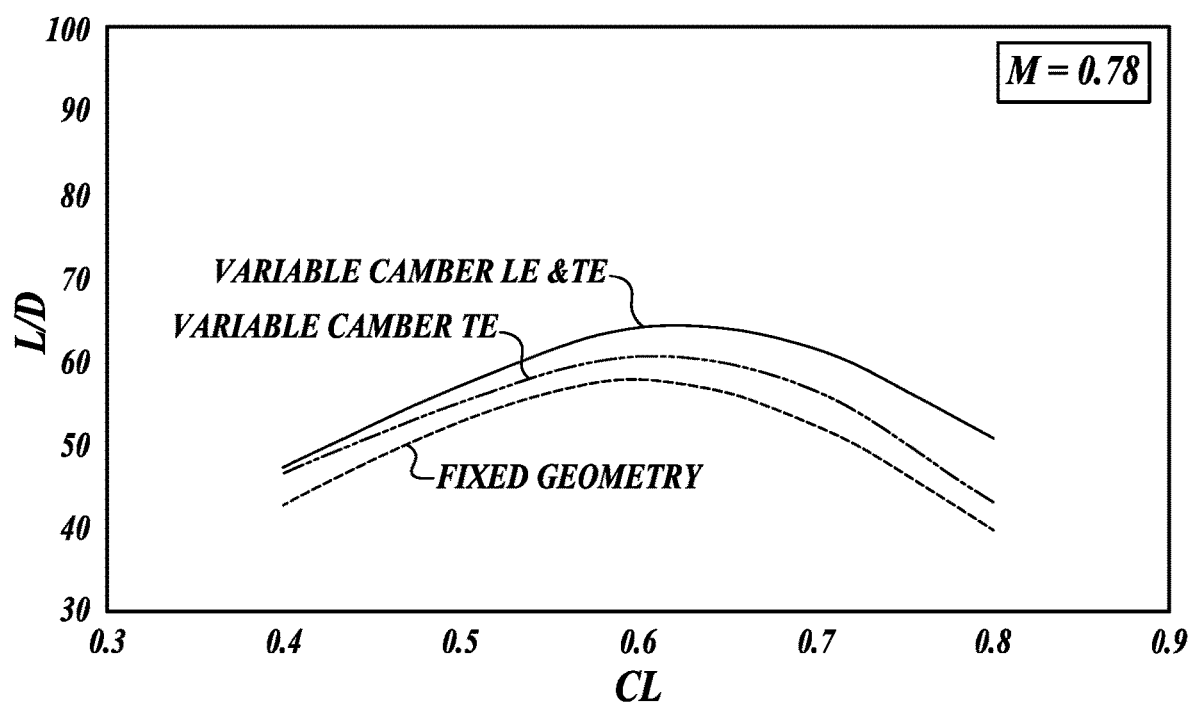
FIG. 12 shows a graph of lift to L/D relative to CL for the airfoil of FIG. 7 at Mach 0.78.

FIGS. 10-12 illustrate the lift to drag ratio (L/D) relative to the lift coefficient (CL) at various speeds for (i) a fixed geometry airfoil. (ii) an airfoil with a variable camber trailing edge, and (iii) an airfoil with variable camber leading and trailing edges. FIGS. 10, 11, and 12 represent performance characteristics at Mach 0.7, Mach 0.74, and Mach 0.78, respectively. For each speed, the most efficient airfoil, i.e., the airfoils with the highest L/D relative to CL, is the airfoil with variable camber leading and trailing edges, followed by the airfoil with a variable camber trailing edge. The least efficient airfoil is the fixed geometry airfoil.

Set forth below in chart form are experimental results for each of (i) a fixed geometry airfoil, (ii) an airfoil with a variable camber trailing edge, and (iii) an airfoil with variable camber leading and trailing edges. Each case represents a specific speed and lift coefficient. Using the fixed geometry airfoil as a baseline, drag reductions realized by including a variable camber leading edge or variable camber leading and trailing edges are shown. As shown in the charts, up to a 7.1% reduction in drag is achieved by the variable camber trailing edge airfoil as compared to the fixed geometry airfoil. The data further shows up to a 14.7% reduction in drag being achieved by the variable leading and trailing edge camber airfoil as compared to the fixed geometry airfoil.

| Case | Mach | CL | Drag |
|---|---|---|---|
| 1 | 0.70 | 0.7 | 88.6 |
| 2 | 0.74 | 0.7 | 91.1 |
| 3 | 0.78 | 0.7 | 133.1 |
| 4 | 0.74 | 0.8 | 103.1 |
| 5 | 0.74 | 0.6 | 88.9 |

Fixed Geometry Wings (No Variable Camber)
CL=0.7, t/c=10%

| Case | Mach | CL | Drag | Δ Drag vs. Fixed Geometry |
|---|---|---|---|---|
| 1 | 0.70 | 0.7 | 89.0 | +0.4 (+0.4%) |
| 2 | 0.74 | 0.7 | 91.3 | −0.6 (−0.7%) |
| 3 | 0.78 | 0.7 | 123.7 | −9.4 (−7.1%) |
| 4 | 0.74 | 0.8 | 99.3 | −3.8 (−3.7%) |
| 5 | 0.74 | 0.6 | 85.1 | −3.8 (−4.3%) |

Fixed Geometry Wings (Variable Camber Trailing Edge)
CL=0.7, t/c=10%

| Case | Mach | CL | Drag | Δ Drag vs. Fixed Geometry |
|---|---|---|---|---|
| 1 | 0.70 | 0.7 | 83.0 | −5.6 (−6.3%) |
| 2 | 0.74 | 0.7 | 87.5 | −4.4 (−4.8%) |
| 3 | 0.78 | 0.7 | 113.5 | −19.6 (−14.7%) |

-continued

| Case | Mach | CL | Drag | Δ Drag vs. Fixed Geometry |
|------|------|-----|------|---------------------------|
| 4 | 0.74 | 0.8 | 95.5 | −7.6 (−7.4%) |
| 5 | 0.74 | 0.6 | 85.6 | −3.3 (−3.7%) |

Fixed Geometry Wings (Variable Camber Leading Edge & Trailing Edge)

CL=0.7, t/c=10%

It will be appreciated that the experimental data set forth above is representative only, and additional benefits can be achieved by further optimizing the airfoils; however, as made clear in the charts, significant drag reduction can be achieved relative to a fixed geometry airfoil by including variable camber leading and trailing edges to mitigate wave drag.

In view of the added efficiencies of airfoils with variable camber leading and trailing edges, aircraft implementing these features in the wings would have several advantages. Such aircraft would have increased range in HSC regimes and also increased speeds. Such aircraft would also have increased fuel efficiency and shorter take-off and landing distances.

Although the above description discloses discrete leading-edge positions (neutral, first, second and third positions, etc.), and discrete speed limits (first, second and third), it is understood that, for a person of skill in the art, the leading-edge device (as well as the trailing-edge device) can be positioned at optimal positions that vary with every combination of speed, lift coefficient, and flight altitude. In the case of the generation of an oblique shock on the upper surface, this is generally done at higher speeds, where the possible reduction on wave drag warrants it. Thus, there is a speed limit above which the leading-edge device would be rotated to a raised position for the generation of the oblique shock near the leading edge. In all other conditions, the leading-edge device is typically deflected downward. The above-described speed limit will vary with the lift coefficient, therefore resulting in a schedule of limits, or limit boundaries (speed vs CL).

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of reducing a wave drag on an airfoil traveling at a speed, at least a portion of the airfoil being configured to be selectively moveable between a first position and a second position, the first position being a first neutral position, and the second position generating a shock wave proximate to a leading edge of the airfoil, the airfoil further comprising a trailing edge selectively moveable between a second neutral position and a lowered position, the method comprising the steps of:
   maintaining the airfoil in the first position when the speed is less than a first limit, the first limit being a subsonic speed greater than Mach 0.70 or a transonic speed; and
   moving the airfoil to the second position when the speed is greater than a first limit, wherein the leading edge is in a raised position and the trailing edge in the lowered position when the airfoil is in the second position,
   wherein the shock wave is formed at a localized concave discontinuity on a forward portion of an upper surface of the airfoil.

2. The method of claim 1, wherein the airfoil is further configured to be selectively moveable to a third position, the third position generating a shock wave on a lower surface of the airfoil proximate to the leading edge.

3. The method of claim 2, further comprising the step of moving the leading edge to the third position when the speed is less than a second limit.

4. The method of claim 3, further comprising the steps of:
   maintaining the trailing edge in the second neutral position when the speed is greater than a third limit; and
   moving the trailing edge to the lowered position when the speed is less than the third limit.

5. The method of claim 1, wherein the airfoil is an aircraft wing.

* * * * *